United States Patent [19]

Merchant et al.

[11] Patent Number: 5,260,700
[45] Date of Patent: Nov. 9, 1993

[54] ENHANCED THROUGHPUT IN SIMULCAST COMMUNICATION SYSTEMS

[75] Inventors: Zaffer Merchant, Lantana; Morris Moore, Wellington, both of Fla.

[73] Assignee: Motorola, Inc., Schaumburg, Ill.

[21] Appl. No.: 945,572

[22] Filed: Sep. 16, 1992

Related U.S. Application Data

[63] Continuation of Ser. No. 536,914, Jun. 12, 1990, abandoned.

[51] Int. Cl.[5] ............................................. G08B 5/22
[52] U.S. Cl. ........................ 340/825.44; 340/825.47;
340/313; 340/504; 371/33; 455/33.3; 455/54.1
[58] Field of Search ................. 340/825.44, 825.47,
340/825.48, 825.49, 313, 504; 371/32, 33;
455/33.1, 33.3, 38.1, 52.1, 54.1, 69, 70, 343;
370/84, 110.1; 379/59, 63

[56] References Cited

U.S. PATENT DOCUMENTS

| | | | |
|---|---|---|---|
| 4,382,256 | 5/1983 | Nagata | 340/825.44 |
| 4,766,599 | 8/1988 | Miyazaki | 371/32 |
| 4,849,750 | 7/1989 | Andros et al. | 340/825.44 |
| 4,918,437 | 4/1990 | Jasinski et al. | 340/825.44 |
| 4,956,641 | 9/1990 | Matai et al. | 340/825.44 |

FOREIGN PATENT DOCUMENTS 2144565A 3/1985 United Kingdom .

OTHER PUBLICATIONS

Standard Message Formats For Digital Radiopaging "Post Office Code Standardisation Advisory Group" British Telecom Autumn 1980 (pp. 43-44).

Primary Examiner—Donald J. Yusko
Assistant Examiner—Michael Horabik
Attorney, Agent, or Firm—Keith A. Chanroo; William E. Koch; Thomas G. Berry

[57] ABSTRACT

A selective call receiver system includes a plurality of base sites capable of simultaneous operation. Each base site includes a transmitter and a base receiver capable of measuring the signal strength of a received signal. A controller coupled to the plurality of base sites, forwards an address to the plurality of base sites. The transmitters thereafter, simultaneously transmit the address to at least one of a plurality of selective call receivers having acknowledge-back capability. At least one of the plurality of base receivers receive an acknowledge-back signal from the at least one of the selective call receivers responding to the transmitted address. The signal strength of the acknowledge-back signal is detected by the plurality of base receivers receiving the acknowledge-back signal. The controller has a determining circuit for determining a value representing the signal strength of the acknowledge-back signal, and an encoder, coupled to the determining circuit, encoding a single copy of the message in a first format or a second format. The encoder encodes the message to derive the single copy of the message in the first format when the value determined by the determining circuit is above a predetermined level and encodes the message with an error correcting code to derive the single copy of the message in the second format when the value determined by the determining circuit is below the predetermined level. The controller thereafter forwards the single copy of the encoded message to the base site.

23 Claims, 7 Drawing Sheets

ENHANCED THROUGHPUT IN SIMULCAST COMMUNICATION SYSTEMS

This is a continuation of application Ser. No. 07/536,914, filed Jun. 12, 1990 now abandoned.

FIELD OF THE INVENTION

This invention relates in general to a method for enhancing throughput in a selective call receiver system and more specifically for enhancing throughput by transmitting a message in a first format or a second format without changing message data rates.

BACKGROUND OF THE INVENTION

In existing simulcast systems, an address of a selective call receiver is transmitted at a low data rate (e.g., 512 or 1200 bits per seconds) by a plurality of base sites. A response from a selective call receiver with acknowledge-back capability is used by a central site (a control site which co-ordinates the plurality of base sites) to determine the proximity of the selective call receiver with respect to the base site or base sites that received the acknowledgement. The central site directs a message at a substantially higher data rate (e.g., 2400 or 4800 bits per second or higher data rates as required) to the base site nearest to the selective call receiver, which broadcasts the message to the selective call receiver. Because the message is broadcasted in a non-simulcast mode, the message data rate can be substantially higher than the data rate used when simulcasting the addresses.

Generally, in any selective call receiver system, the goal is to reduce wasted air time, thus making it more cost effective to consumers who subscribe to this system. Simulcasting the address at a low data rate and sending the message at a higher data rate will generally reduce the air time particularly when transmitting long messages. Additionally, there are cases when it is more economical to have more than one "high" message data rate for different messages. For example, a long message or the particular location of the selective call receiver with respect to a base site may make necessary to have more than one "high" message rate. However, increasing the number of message rates will significantly increase the cost of the transmitters and receivers in the base sites. More importantly, increasing the number of message rates used to transmit different messages will significantly increase the cost of selective call receivers, because it will be desirable or necessary to have the selective call receivers capable of receiving all the available message rates for the different messages. The additional cost of such a selective call receiver may be less attractive to many subscribers.

SUMMARY OF THE INVENTION

A selective call receiver system comprises a plurality of base sites capable of simultaneous operation. Each base site includes a transmitter and a base receiver capable of measuring the signal strength of a received signal. A controller means, coupled to the plurality of base sites, forwards an address to the plurality of base sites. The transmitters simultaneously transmit the address to at least one of a plurality of selective call receivers having acknowledge-back capability. At least one of the plurality of base receivers receive an acknowledge-back signal from the at least one of the selective call receivers responding to the transmitted address. The signal strength of the acknowledge-back signal is detected by the plurality of base receivers receiving the acknowledge-back signal. The controller comprises a determination means for determining a value representing the signal strength of the acknowledge-back signal, and an encoder means, coupled to said determination means, encoding a single copy of the message in a first format or a second format. The encoder means encodes the message to derive the single copy of the message in the first format when the value determined by the determination means is above a predetermined level and encodes the message with an error correcting code to derive the single copy of the message in the second format when the value determined by the determination means is below the predetermined level. The controller thereafter forwards the single copy of the encoded message to the base site.

DESCRIPTION OF A PREFERRED EMBODIMENT

Figure 1:
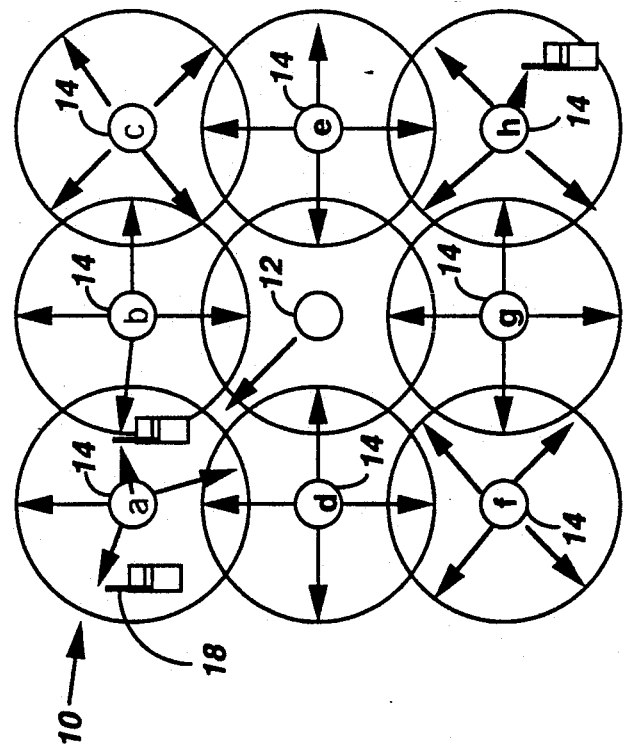
FIG. 1 is a diagram of a known selective call receiver system capable of operating in a simulcast mode.

Referring to FIG. 1, a typical selective call receiver system 10 operating in simulcast mode is shown with a substantially centrally located central or control site 12 surrounded by a plurality of remote sites 14 (identified as a-h). In operation, the selective call receiver system 10 simulcasts an address over the coverage area at a low data rate (512 or 1200 bits per second). A selective call receiver 18, with acknowledge-back capability, upon receiving its address will respond with an acknowledgment signal. The acknowledgment is used by a central site 12 (a control site which co-ordinates the plurality of base sites) to determine the position of the selective call receiver 18 with respect to the base site 14 that received the acknowledgment (14a in the illustrated example). The central site 12, after receiving the acknowledge-back signal, directs a message at a substantially higher data rate (e.g., 2400 or 4800 bits per second or higher data rates as required) to the base site (14a) nearest to the selective call receiver 18.

Figure 2:
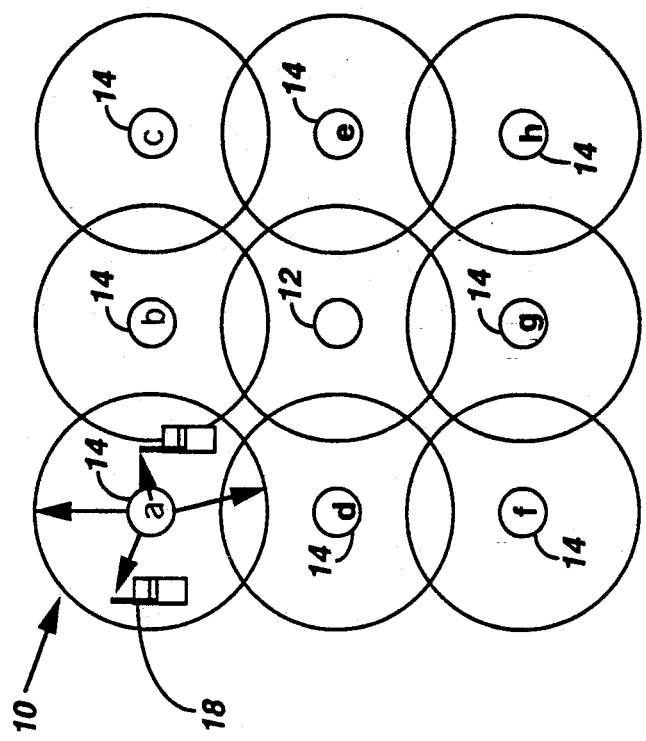
FIG. 2 is a diagram of a known selective call receiver system operating in a non-simulcast mode.

FIG. 2 shows the same selective call receiver system 10 operating in a non-simulcast mode. The already formated high data rate message from central site 12, upon receipt, is broadcast by the base site (14a) to the addressed selective call receiver 18. Because the message is broadcasted in a non-simulcast mode, the data rate may be substantially higher than the data rate used when simulcasting the addresses.

For a more detailed description of the structure and operation of the system of the type shown in FIGS. 1 and 2, reference U.S. Pat. No. 4,918,437 which is hereby incorporated by reference.

Figure 3:
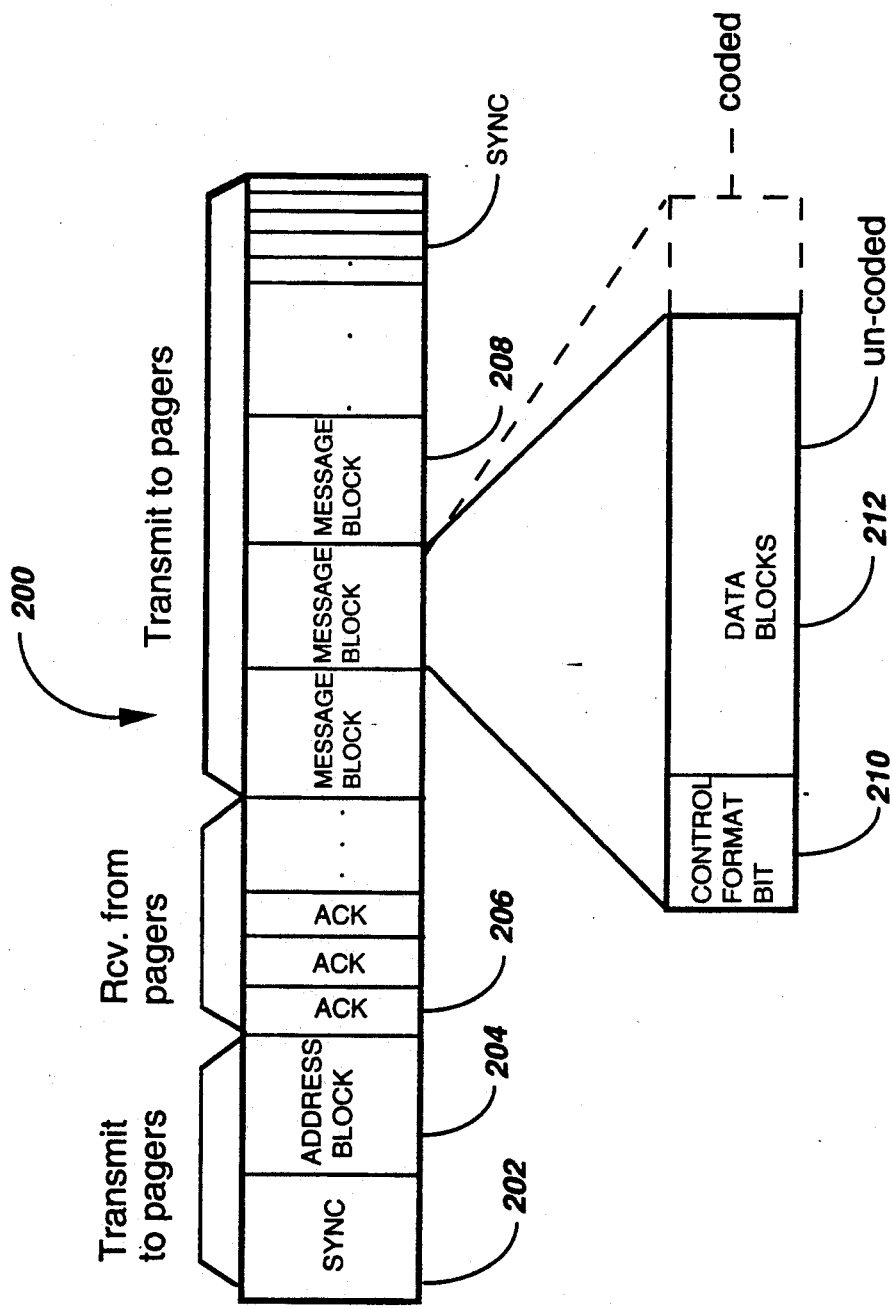
FIG. 3 is a signaling format of a simulcast transmission system in accordance with the present invention.

The signaling format 204 of the invention is shown in FIG. 3. The central site 12 and the base sites 14 transmit synchronization data (block 202) and addresses (block 204) in a simulcast mode to the selective call receivers. When the addressed selective call receiver acknowledges the receipt of its address, the acknowledgment is received in one of the ACK blocks 206. Following the receipt of the acknowledgment, a message is transmitted at a higher data rate as one or more of message blocks 208. Message blocks 208 comprises a control format bit 210, which identifies the message format to be used to decode the message. Following the control format bit 210 are the data bits 212 which are sent to the addressed selective call receiver so that the message may be presented to the user. In accordance to the invention, the data block 212 shows a reduced number of data bits when the bits are transmitted in an un-coded format. The broken lines shows the additional bits transmitted in accordance to coded format.

The broken lines in FIG. 3 shows the message transmitted with error correction code (ECC) such as that used in the POCSAG to the determined base site when the signal strength is below a pre-determined level. According to the invention, the solid lines shows a throughput enhancement by transmitting the message un-coded (without ECC) when the signal strength is above the pre-determined level. The transmission of the message is at same high data rate with both formats to accomplish fast transmission of long messages. Because the same message may be sent in a coded or un-coded format an increase in throughput is achieved when the message is sent in the un-coded format because fewer bits are sent to convey the same message when compared to the coded format. This scheme, therefore, saves air-time by sending un-coded messages when the selective call receivers are close to the receiving base site.

Figure 4:
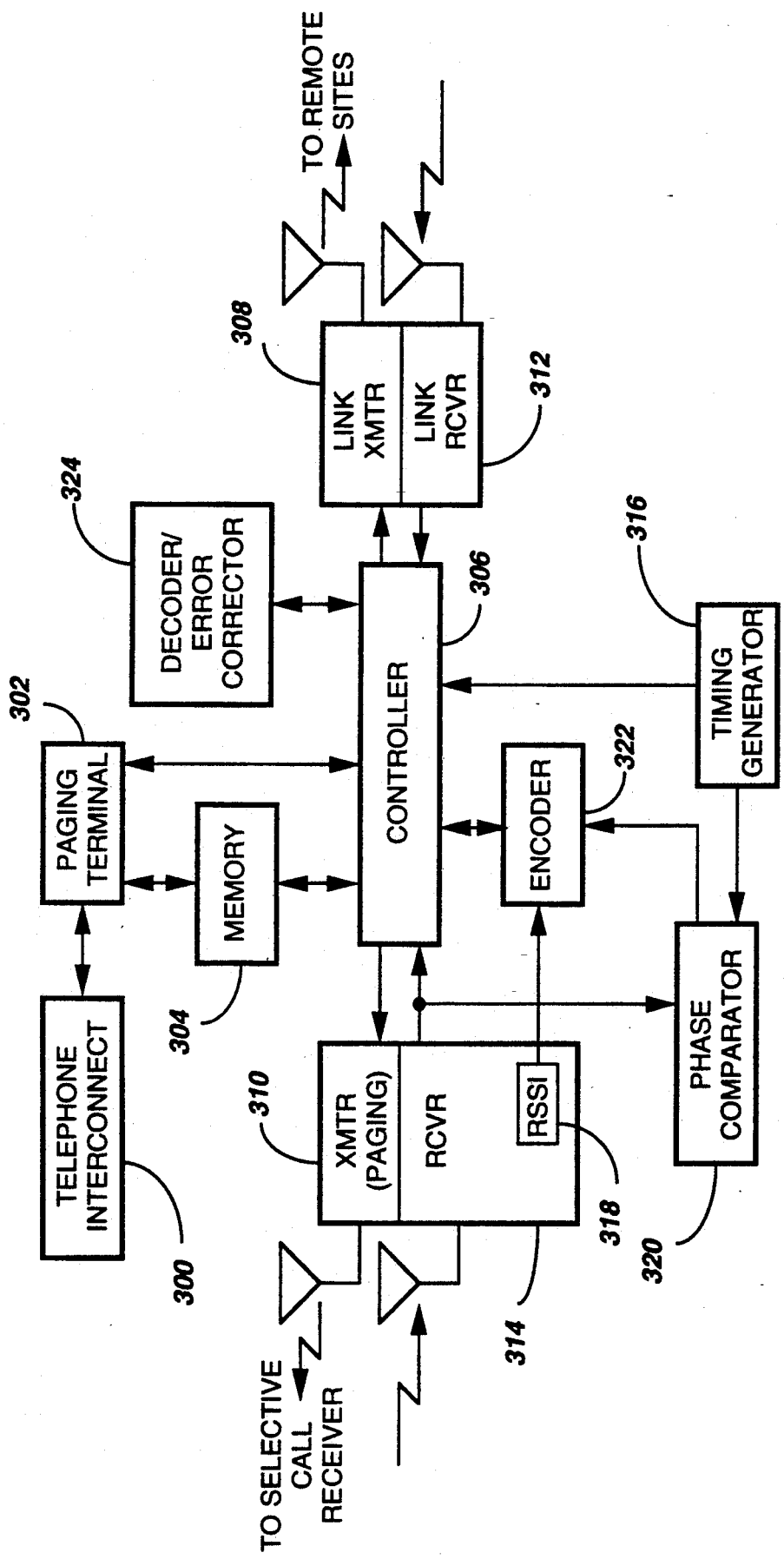
FIG. 4 is a block diagram of a central base site.

Referring to FIG. 4, the preferred central site comprises a telephone interconnect 300, which allows messages to enter into the system through a public or private telephone network using a telephone or an alphanumeric entry device. The paging terminal 302 processes the information received through the telephone interconnect 300. The generated addresses and messages are stored in memory 304 until the next transmission cycle. The paging terminal 302 suitable for use in the present invention is well known to those skilled in the art.

The paging terminal 302 is coupled to a controller 306, which controls the operation of the link transmitter 308, paging transmitter 310, link receiver 312, and acknowledgment receiver 314. A controller 306 suitable for use in the present invention is well known to those skilled in the art. A timing generator 316 provides a high accuracy clock that couples to the controller 306 to maintain system timing for simulcast operation through synchronization of all remote sites. The received signal strength of the acknowledgment signal is used to determine the location of the addressed selective call receiver. The received signal strength indicator (RSSI) 318 generates a signal strength indicator which is coupled to encoder 322, which includes an A/D convertor, that produces a format suitable for processing by the controller 306. The controller 306, the timing generator 316, and phase comparator 320 determine the highest signal strength and the associated phase delay of the received signal, which is used to identify the transmission cell in which the selective call receiver is located.

The link transmitter 308 at the central site, link receiver 312 at the remote sites and site controller 330 (FIG. 5) accept messages directed to a particular remote site.

Operationally, the controller 306 checks the threshold of the encoded acknowledgment signal to determine whether to transmit the message in a coded or an un-coded format. When the acknowledgment signal received from the encoder 322 is above a pre-defined threshold the controller transmits an un-coded message since there is a lesser likelihood the message will suffer from random type transmission degradation. Random type degradation are those errors which occur singularly on the channel without showing a reduction in the RSSI of the bit received in error. Before the message is transmitted it is interleaved using conventional techniques to guard against burst type errors. Conversely, when the encoded acknowledgment signal is received, and the RSSI is below the threshold, the controller 306 transmits a coded message such as POCSAG because there is a greater likelihood that the signal will be degraded by random errors. Along with the message, the controller encodes a bit 210 (i.e., the control format bit FIG. 3) according to the whether the message is being sent in a coded or un-coded format. As further seen from FIG. 3, the block 212 expands (shown by the broken lines) when the message is transmitted in the coded format.

Figure 5:
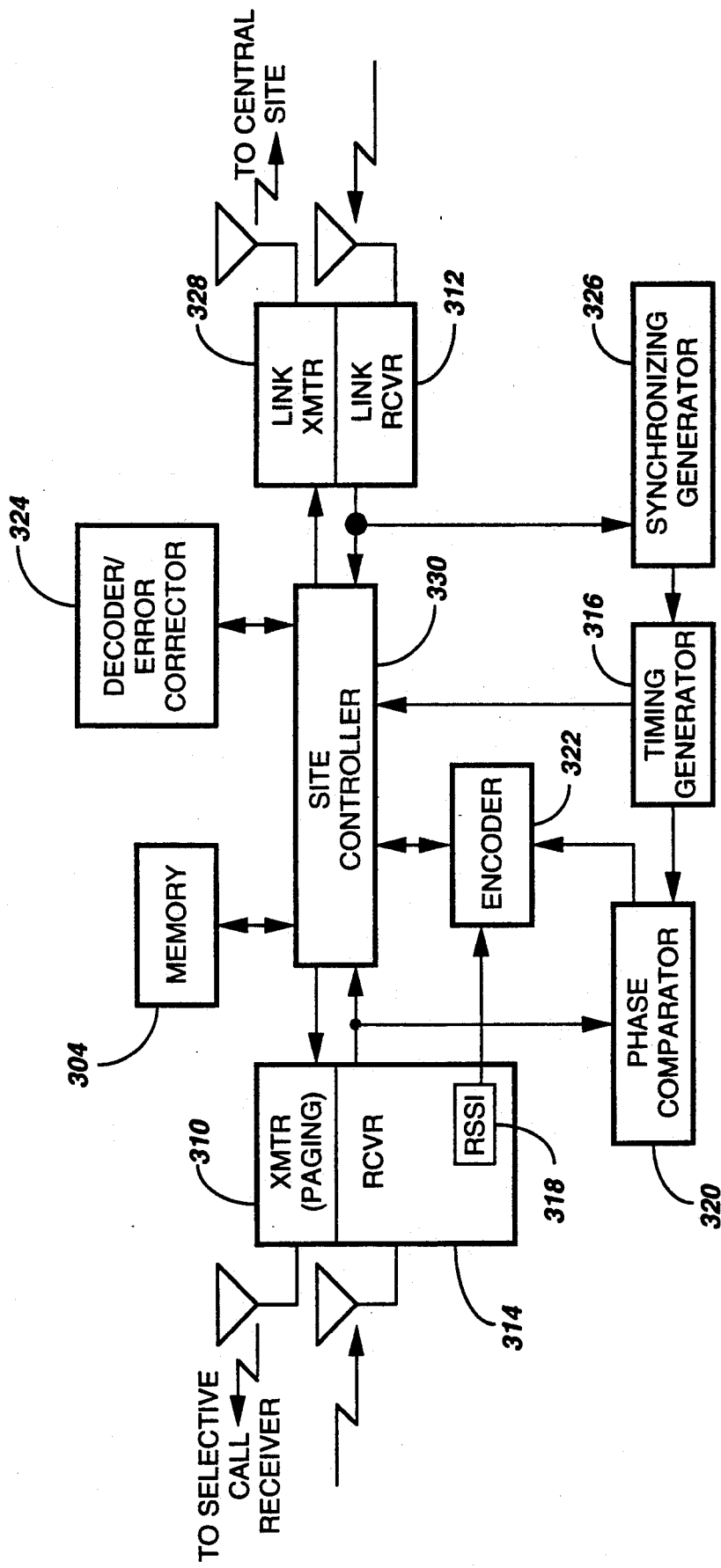
FIG. 5 is a block diagram of a remote base site.

Referring to FIG. 5, the remote site is seen to be similar to the central site, with similar elements having identical numbers. The link receiver 312 receives bursts from the central site. The acknowledgments are transmitted from the remote site 14 to the central site 12. The site controller 330 operates similarly to the controller 306 in the central site 12 except the remote site 14 has no telephone interconnection as shown in the central site. For a more detailed description of the structure and operation of the central and remote sites of the type shown in FIGS. 4 and 5 reference U.S. Pat. No. 4,918,437 which is hereby incorporated by reference.

Figure 6:
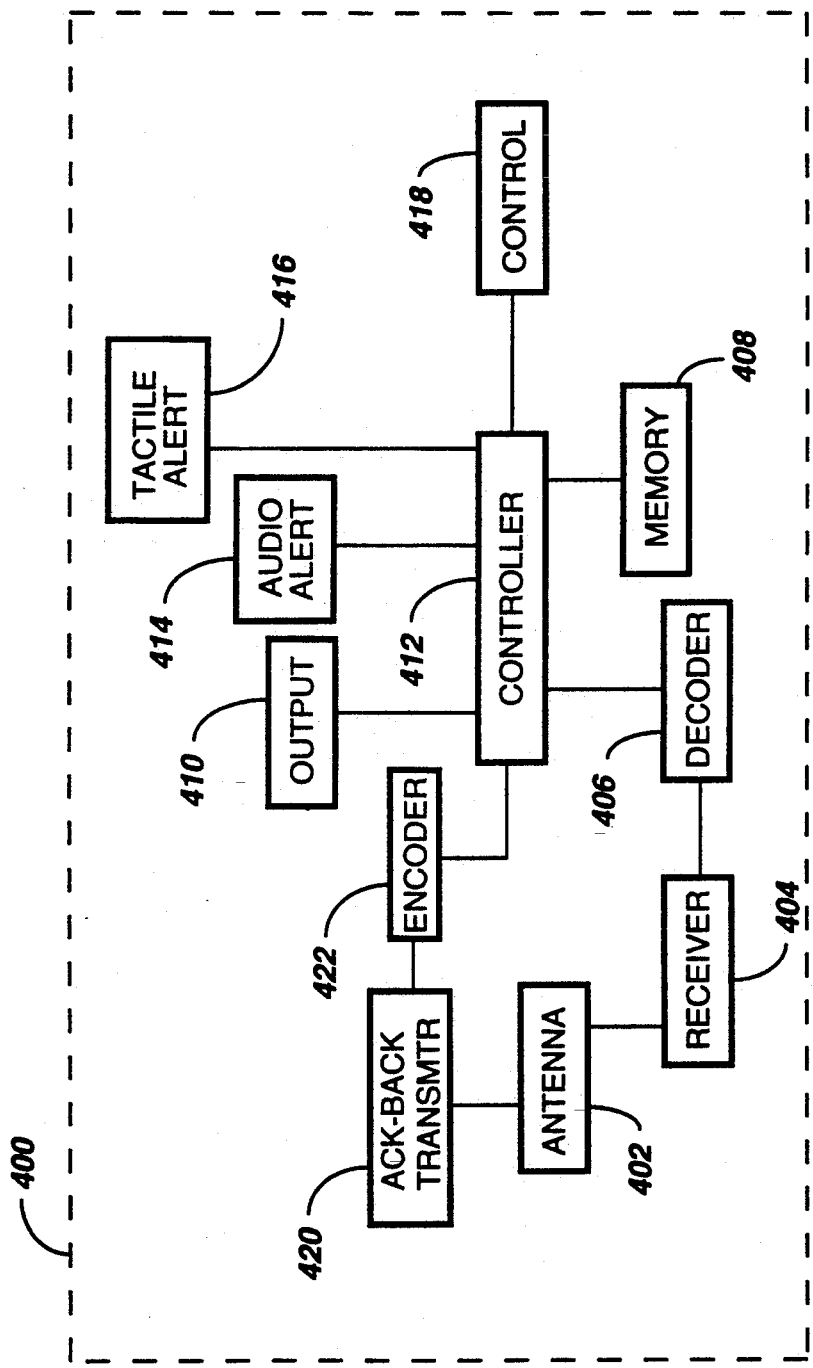
FIG. 6 is a block diagram of a selective call receiver with acknowledge back capability in accordance to the invention.

Referring to FIG. 6, a selective call radio receiver 400 (e.g., a pager) comprises an antenna 402 that provides a received RF signal that is demodulated within a receiver module 404. The receiver module 404 generates a recovered signal suitable for processing by a decoder 406 in a manner well known to those skilled in the art. The decoder 406 converts the signal to a received address, which is compared to the address stored in memory 408. When the received address corresponds to the stored address, the selective call receiver sends an acknowledgment. The acknowledgment is first encoded into a suitable format by encoder 422 and subsequently transmitted by an ack-back transmitter 420 via the antenna 402.

The selective call receiver 400 awaits a message, at a substantially higher data rate than the previously received data rate of the address, and when the message is received it is processed similarly to the discussion above. After receipt of the message, the decoder 406 determines which format to use in decoding the message by examining the control format bit. The controller 412, after the selective call receiver receives the message, alerts the user that a message has been received either by an audio alert 414 (e.g., speaker) or a tactile alert 416 (e.g., vibrator). The output module 410 automatically, or when manually selected by controls 418, presents the message such as by displaying the message on a display.

Figure 7:
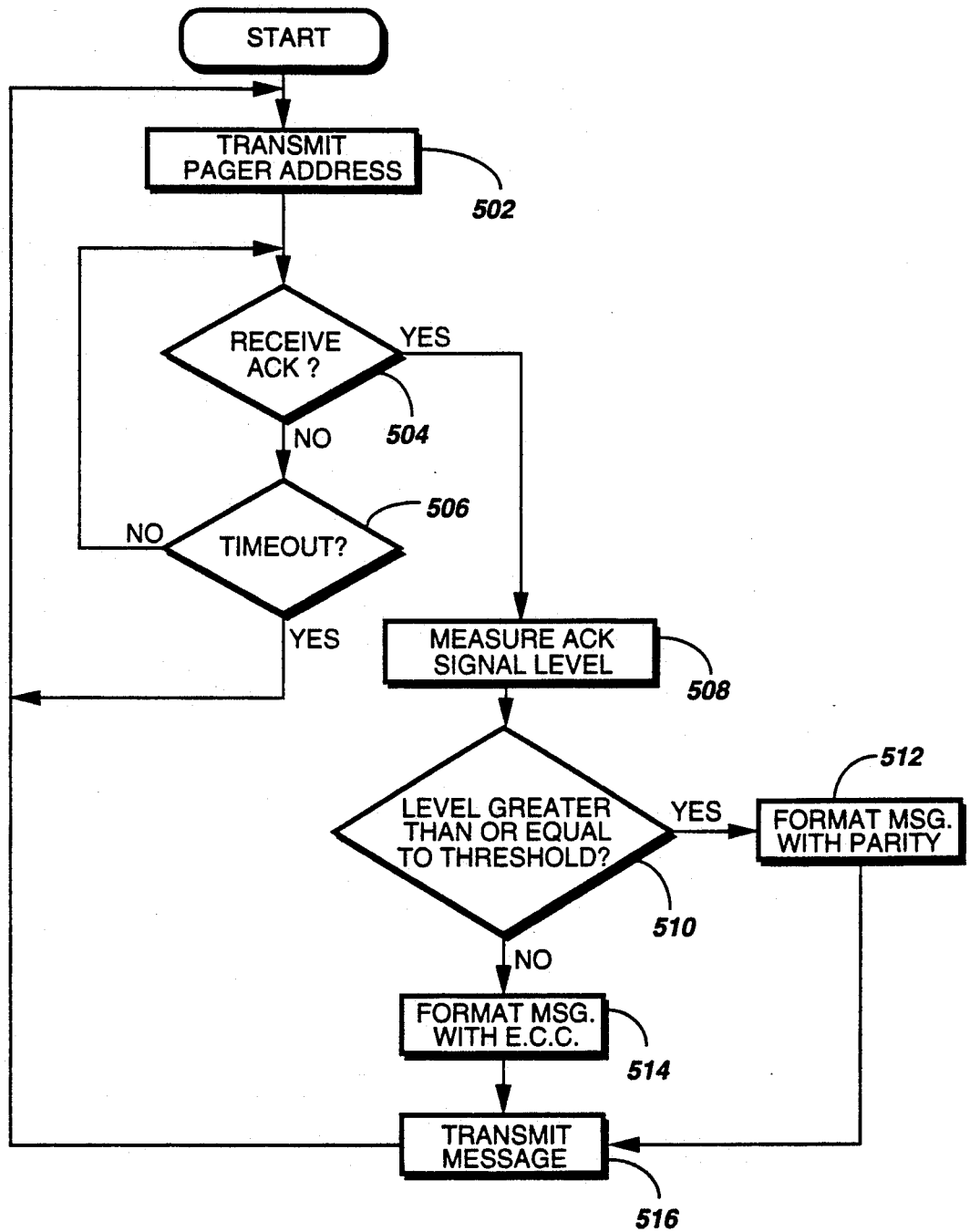
FIG. 7 is a flow chart of the operation of the central site in accordance with the invention.

The selective call receiver system operation of the present invention is shown in the flow chart of FIG. 7. The addresses are simulcast by the plurality of remote site in step 502. Next, the selective call receiver system awaits the transmission of the acknowledgment (step 504), and if no acknowledgment is received after the expiration of a pre-defined length of time, the system will "timeout" (step 506). Following the "timeout" operation, the selective call receiver system awaits the next acknowledgment signal (step 504). However, when the selective call receiver's acknowledgment is received (step 504), the signal strength is measured (step 508). The signal strength is compared to a pre-determined level (step 510), and if the signal level is above the pre-determined level the message is preferably formated only with a parity bit (i.e., no additional error correcting coding), step 512, and then the message is transmitted to the addressed selective call receiver (step 516). Conversely, if the signal strength of the acknowledgment is below the pre-determined level the message is formated with a error correction code (ECC) such as POCSAG, step 514, and then transmitted as discussed above (step 516).

Figure 8:
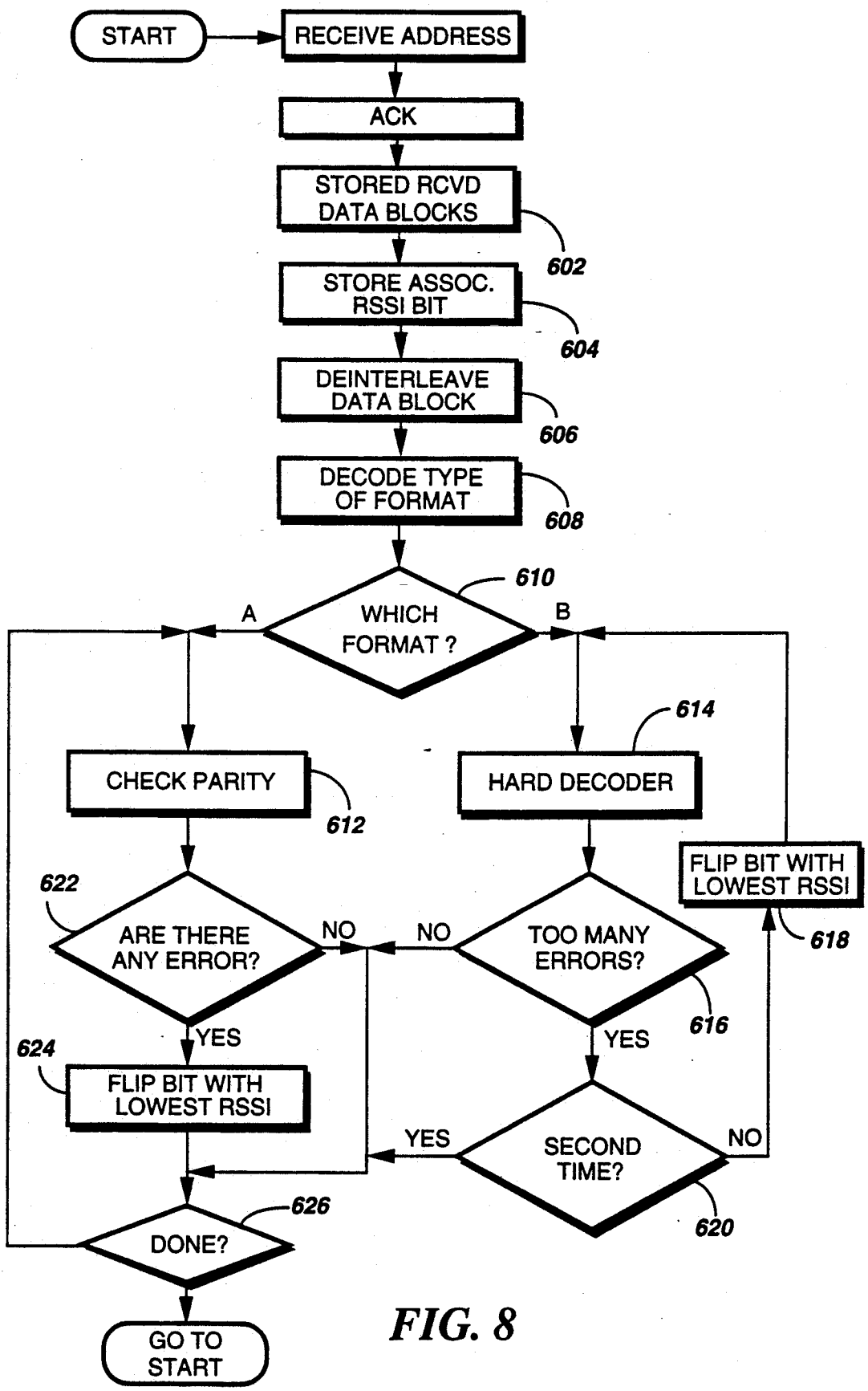
FIG. 8 is a flow chart of the operation of the selective call receiver in accordance with the invention.

The operation of the selective call receiver is shown by the flow chart in FIG. 8. After the selective call receiver has transmitted its acknowledgment, it waits until it receives a subsequent message at a higher data rate (higher than the previously received address data rate) which is stored (step 602). Corresponding RSSI values for each bit are also stored (step 604). The received data block is de-interleaved using conventional techniques (step 606), and the control format bit of the message is subsequently checked to determine which message format was transmitted (step 608).

Depending on the control format bit, the appropriate decoding format is determined (step 610). If the un-coded format was used, the parity bit is checked (step 612) to determine if the message was received with errors. Subsequent to the parity check (step 612), another error check is made (step 622), and if there are more errors, the bit with the corresponding lowest RSSI value is complemented (step 624). Step 626 then checks if all the errors were corrected, and if yes, the process shifts to the start step. If no, the process continues at step 612. Conversely, if the message was transmitted in the ECC format, it is passed through a hard decoder (the corresponding decoder for the ECC), step 614. Subsequent to the hard decoder, the message is checked to determine if the resulting errors are below a pre-determined number (step 616), and if the pre-determined number of errors or less is found then the actual number and position of the error(s) is determined (step 618). The process continues as discussed above when the data is transmitted in the un-coded format. However, if too many errors were determined, the number of times an attempt was made by the hard decoder is stored and checked to make sure there are no more than two attempts at correcting the message (step 620). If there were fewer that two attempts, the bit with the lowest RSSI value is complemented (step 618), and the process is repeated from step 614 as discussed above.

In summary, a selective call receiver system transmits an address at a low data rate to a selective call receiver. Subsequent to the transmission of the address, the system awaits an acknowledgment signal from the addressed selective call receiver to determine the signal strength and the base site(s) receiving the acknowledgment. That is, if there are more than one base site receiving the same acknowledgment, the base site receiving the strongest acknowledgment signal will be selected to transmit a message to the selective call receiver. The message is transmitted with error correction code (ECC) to the determined base site when the signal strength is below a pre-determined level, and transmitted un-coded (without ECC) when the signal strength is above the pre-determined level. The transmission of the message is at the same high data rate with both formats to accomplish fast transmission of long messages. Finally, because the same message may be sent in a coded or un-coded format an increase in throughput is achieved when the message is sent in the un-coded format, because fewer bits are sent to convey the same message when compared to the coded format. This scheme, therefore, saves air-time by sending un-coded messages when the selective call receivers are close to the receiving base site.

We claim:

1. A selective call receiver system comprising:
   a plurality of base sites capable of simultaneous operation, each including a transmitter and a base receiver capable of measuring the signal strength of a received signal; and
   controller means for forwarding an address to said plurality of base sites, said transmitters simultaneously transmitting the address to at least one of a plurality of selective call receivers having acknowledge-back capability, at least one of said plurality of base receivers receiving an acknowledge-back signal from the at least one of said selective call receivers responding to the transmitted address, the signal strength of said acknowledge-back signal being detected by said plurality of base receivers receiving the acknowledge-back signal, said controller means comprising:
   determination means for determining a value representing the signal strength of the acknowledge-back signal and said determination means further determines the signal strength of the strongest acknowledge-back signal when two or more base receivers have received the acknowledge-back signal and the base site receiving the strongest acknowledge-back signal; and
   encoder means for encoding a single copy of the message in a first format or a second format wherein said encoder means encodes the message in the first format when the signal strength is below a predetermined level and encodes the message in the second format when the signal strength is above the predetermined level, said controller thereafter forwarding the single copy of the encoded message to the determined base site.

2. The selective call receiver system according to claim 1 wherein the transmitter is capable of transmitting addresses at a first data rate.

3. The selective call receiver system according to claim 1 wherein the transmitter is capable of transmitting messages at a second data rate.

4. The selective call receiver system according to claim 1 wherein the signal transmitted in the first format comprises a non-error correction coded message.

5. The selective call receiver system according to claim 1 wherein the signal transmitted in the second format comprises an error correction coded message.

6. The selective call receiver system according to claim 4 wherein the signal is interleaved before transmission by the controller.

7. The selective call receiver system according to claim 5 wherein the signal is interleaved before transmission by the controller.

8. In a selective call receiver system, a method for transmitting messages, comprising the steps of:
(a) transmitting an address to at least one selective call receiver having acknowledge-back capability;
(b) receiving an acknowledge-back signal from the at least one of the selective call receiver in response to the transmitted address;
(c) determining a value for representing signal strength of the received acknowledge-back signal;
(d) encoding a single copy of the message into a first format when the value exceeds a predetermined threshold, and into a second format when the value is below the predetermined threshold; and
(e) transmitting the single copy of the message in the encoded format.

9. The method according to claim 8 wherein step (a) further comprises the step of transmitting the address at a first data rate from a plurality of base sites and thereafter wherein step (e) comprises the step of transmitting the message at a second data rate substantially higher than the first data rate from the base site receiving the acknowledge-back signal having the highest signal strength.

10. A selective call receiver comprising:
receiving means for receiving a predetermined address at a first data rate and receiving a single copy of a subsequent message encoded in a first or second format at a second data rate substantially higher than the first data rate, the message including a control information identifying the format of the message;
transmitter means for transmitting an acknowledge-back signal in response to the received predetermined address, and
processor means coupled to the receiver means for determining whether to process the received message in the first or second format in response to the received control information.

11. The selective call receiver according to claim 10 wherein the first format includes a non-error correction coded message and the second format includes an error correction coded message.

12. The selective call receiver according to claim 10 wherein an interleaved encoded received message is deinterleaved before processing by the processing means.

13. A method for receiving message with a selective call receiver having acknowledge-back capability, comprising the steps of:
a) receiving a predetermined address;
b) transmitting an acknowledge-back signal in response to the predetermined address;
c) receiving a single copy of a message encoded in a first or second format including control information indicative of the message format; and
d) processing the control information to determine whether to process the message in accordance with the first or second format, wherein the first format includes an uncoded message and the second format includes an error correction coded message.

14. The method according to claim 13 wherein step (a) comprises the step of receiving the address from one of a plurality of base sites and step (c) comprises the step of receiving the message from one predetermined base site receiving the acknowledgement with the highest signal strength.

15. A selective call receiver system comprising:
a plurality of base sites capable of simultaneous operation, each including a transmitter and a base receiver capable of measuring the signal strength of a received signal; and
controller means, coupled to said plurality of base sites, for forwarding an address to said plurality of base sites, said transmitters simultaneously transmitting the address to at least one of a plurality of selective call receivers having acknowledge-back capability, at least one of said plurality of base receivers receiving an acknowledge-back signal from the at least one of said selective call receivers responding to the transmitted address, the signal strength of said acknowledge-back signal being detected by said plurality of base receivers receiving the acknowledge-back signal, said controller comprising:
determination means for determining a value representing the signal strength of the acknowledge-back signal; and
encoder means, coupled to said determination means, for encoding a single copy of the message in a first format or a second format wherein said encoder means encodes the message to derive the single copy of the message in the first format when the value determined by the determination means is above a predetermined level and encodes the message with an error correcting code to derive the single copy of the message in the second format when the value determined by the determination means is below the predetermined level, said controller thereafter forwarding the single copy of the encoded message to the base site.

16. The selective call receiver system according to claim 15 wherein said determination means further determines the signal strength of the strongest acknowledge-back signal when two or more base receivers have received the acknowledge-back signal and determines the base site receiving the strongest acknowledge-back signal.

17. In a selective call receiver system, a method for transmitting messages, comprising the steps of:
(a) transmitting an address to at least one selective call receiver having acknowledge-back capability;
(b) receiving an acknowledge-back signal from the at least one of the selective call receiver in response to the transmitted address;
(c) determining a value for representing signal strength of the received acknowledge-back signal;
(d) encoding a single copy of the message into a first format or a second format wherein said step of encoding encodes the message to derive the single copy of the message in the first format having no error correction code when the value determined by step (c) is above a predetermined level and encodes the message and information for error correcting the message to derive the single copy of the message in the second format when the value determined by step (c) is below the predetermined level; and
(e) transmitting the single copy of the message in the encoded format.

18. A selective call receiver comprising:
receiving means for receiving a predetermined address at a first data rate and receiving a single copy of a subsequent message encoded in a first or second format at a second data rate substantially higher than the first data rate, the message including a control information identifying the format of the message;

transmitter means, coupled to said receiving means, for transmitting an acknowledge-back signal in response to the received predetermined address, and processor means coupled to the receiver means for determining whether to process the received message in the first or second format in response to the received control information wherein the processor means, in response to the control information, processes the message in the first format as having no error correction code to derive the single copy of message, and processes the message in the second format as having error correction code to derive the single copy of the message.

19. A method for receiving message with a selective call receiver having acknowledge-back capability, comprising the steps of:

a) receiving a predetermined address;
b) transmitting an acknowledge-back signal in response to the predetermined address;
c) receiving a single copy of a message encoded in a first or second format including control information indicative of the message format; and
d) processing the control information to determine whether to process the message in accordance with the first or second format, wherein the step of processing, in response to the control information, processes the message in the first format as having no error correction code to derive the single copy of message, and processes the message in the second format as having error correction code to derive the single copy of the message.

20. A selective call receiver system comprising:

a plurality of base sites capable of simultaneous operation, each including a transmitter and a base receiver capable of measuring the signal strength of a received signal; and controller means, coupled to said plurality of base sites, for forwarding an address to said plurality of base sites, said transmitters simultaneously transmitting the address to at least one of a plurality of selective call receivers having acknowledge-back capability, at least one of said plurality of base receivers receiving an acknowledge-back signal from the at least one of said selective call receivers responding to the transmitted address, the signal strength of said acknowledge-back signal being detected by said plurality of base receivers receiving the acknowledge-back signal, said controller comprising:

determination means for determining a value representing the signal strength of the acknowledge-back signal; and encoder means, coupled to said determination means, for encoding a single copy of the message in a non-error correcting format or an error correcting format wherein said encoder means encodes the message to derive the single copy of the message in the non-error correcting format when the value determined by the determination means is above a predetermined level and encodes the message and information for error correcting the message to derive the single copy of the message in the error correcting format when the value determined by the determination means is below the predetermined level, said controller thereafter forwarding the single copy of the encoded message to the base site.

21. In a selective call receiver system, a method for transmitting messages, comprising the steps of:

(a) transmitting an address to at least one selective call receiver having acknowledge-back capability;
(b) receiving an acknowledge-back signal from the at least one of the selective call receiver in response to the transmitted address;
(c) determining a value for representing signal strength of the received acknowledge-back signal;
(d) encoding a single copy of the message into a non-error correcting format or an error correcting format wherein said step of encoding encodes the message to derive the single copy of the message in the non-error correcting format having no error correction capability when the value determined by step (c) is above a predetermined level and encodes the message and information for error correcting the message to derive the single copy of the message in the error correcting format when the value determined by step (c) is below the predetermined level; and
(e) transmitting the single copy of the message in the encoded format.

22. A selective call receiver comprising:

receiving means for receiving a predetermined address at a first data rate and receiving a single copy of a subsequent message encoded in a non-error correcting format or error correcting format at a second data rate substantially higher than the first data rate, the message including a control information identifying the format of the message;

transmitter means, coupled to said receiving means, for transmitting an acknowledge-back signal in response to the received predetermined address, and processor means coupled to the receiver means for determining whether to process the received message in the non-error correcting format or the error correcting format in response to the received control information wherein the processor means, in response to the control information, processes the message in the non-error correcting format as having no error correction capability to derive the single copy of message, and processes the message in the error correcting format as having error correction code to derive the single copy of the message.

23. A method for receiving message with a selective call receiver having acknowledge-back capability, comprising the steps of:

a) receiving a predetermined address;
b) transmitting an acknowledge-back signal in response to the predetermined address;
c) receiving a single copy of a message encoded in a non-error correcting format or an error correcting format including control information indicative of the message format; and
d) processing the control information to determine whether to process the message in accordance with the non-error correcting format or error correcting format, wherein the step of processing, in response to the control information, processes the message in the non-error correcting format as having no error correction capability to derive the single copy of message, and processes the message in the error correcting format as having error correction code to derive the single copy of the message.

* * * * *